(12) United States Patent
Shrestha et al.

(10) Patent No.: US 10,445,187 B2
(45) Date of Patent: Oct. 15, 2019

(54) SEARCHING AND INDEXING OF BACKUP DATA SETS

(71) Applicant: Actifio, Inc., Waltham, MA (US)

(72) Inventors: Niva Shrestha, Franklin, MA (US); Jonathan Raymond Choate, Princeton, MA (US)

(73) Assignee: Actifio, Inc., Waltham, MA (US)

( * ) Notice: Subject to any disclaimer, the term of this patent is extended or adjusted under 35 U.S.C. 154(b) by 537 days.

(21) Appl. No.: 14/966,718

(22) Filed: Dec. 11, 2015

(65) Prior Publication Data

US 2016/0170836 A1    Jun. 16, 2016

Related U.S. Application Data

(60) Provisional application No. 62/091,220, filed on Dec. 12, 2014.

(51) Int. Cl.
*G06F 11/14* (2006.01)
*G06F 16/13* (2019.01)
*G06F 16/14* (2019.01)

(52) U.S. Cl.
CPC ...... *G06F 11/1451* (2013.01); *G06F 11/1458* (2013.01); *G06F 16/13* (2019.01); *G06F 16/148* (2019.01)

(58) Field of Classification Search
CPC ......... G06F 17/30185; G06F 17/30353; G06F 17/30368; G06F 17/30312; G06F 17/30321; G06F 11/1451; G06F 11/1458; G06F 17/30091; G06F 17/30106; G06F 16/148; G06F 16/13

USPC .......................................................... 707/654
See application file for complete search history.

(56) References Cited

U.S. PATENT DOCUMENTS

| | | |
|---|---|---|
| 4,626,829 A | 12/1986 | Hauck |
| 5,381,545 A | 1/1995 | Baker et al. |
| 5,410,667 A | 4/1995 | Belsan et al. |
| 5,497,483 A | 3/1996 | Beardsley et al. |

(Continued)

OTHER PUBLICATIONS

Alapati, "NetApp Technical Report: SnapMirror Sync and SnapMirror Semi-Sync Overview and Design Considerations," NetApp, Jul. 2010 (24 pages).

(Continued)

*Primary Examiner* — Evan Aspinwall
(74) *Attorney, Agent, or Firm* — Wilmer Cutler Pickering Hale and Dorr LLP

(57) ABSTRACT

Systems and methods of providing search capabilities for data backups by indexing multiple time-based versions of the data backups such that the multiple time-based versions of each of the data backups are factored into a search result. First data associated with a first backup of a data set is received, the first data including a list of changes associated with the data set between a first backup and a second backup. For each of the first backup, second backup and one or more intermediary backups an index representative of difference data is created. Second data associated with a search request is received. A version of the file is retrieved based on the search request, thereby providing search capabilities for data backups by indexing data backups at a plurality of backup times such that multiple versions of each of the data backups are factored into a search result.

20 Claims, 13 Drawing Sheets

(56) References Cited

U.S. PATENT DOCUMENTS

| | | | |
|---|---|---|---|
| 5,535,381 | A | 7/1996 | Kopper |
| 5,819,292 | A | 10/1998 | Hitz et al. |
| 5,828,876 | A | 10/1998 | Fish et al. |
| 5,857,208 | A | 1/1999 | Ofek |
| 5,963,962 | A | 10/1999 | Hitz et al. |
| 6,065,018 | A | 5/2000 | Beier et al. |
| 6,081,875 | A | 6/2000 | Clifton et al. |
| 6,119,208 | A | 9/2000 | White et al. |
| 6,131,148 | A | 10/2000 | West et al. |
| 6,148,412 | A | 11/2000 | Cannon et al. |
| 6,163,856 | A | 12/2000 | Dion et al. |
| 6,192,444 | B1 | 2/2001 | White et al. |
| 6,199,146 | B1 | 3/2001 | Pence |
| 6,202,071 | B1 | 3/2001 | Keene |
| 6,212,531 | B1 | 4/2001 | Blea et al. |
| 6,226,759 | B1 | 5/2001 | Miller et al. |
| 6,269,381 | B1 | 7/2001 | St. Pierre et al. |
| 6,269,431 | B1 | 7/2001 | Dunham |
| 6,324,548 | B1 | 11/2001 | Sorenson |
| 6,330,614 | B1 | 12/2001 | Aggarwal et al. |
| 6,434,681 | B1 | 8/2002 | Armangau |
| 6,460,055 | B1 | 10/2002 | Midgley et al. |
| 6,484,186 | B1 | 11/2002 | Rungta |
| 6,487,561 | B1 | 11/2002 | Ofek et al. |
| 6,557,089 | B1 | 4/2003 | Reed et al. |
| 6,625,704 | B2 | 9/2003 | Winokur |
| 6,654,772 | B1 | 11/2003 | Crow et al. |
| 6,654,912 | B1 | 11/2003 | Viswanathan et al. |
| 6,665,815 | B1 | 12/2003 | Goldstein et al. |
| 6,668,264 | B1 | 12/2003 | Patterson et al. |
| 6,772,302 | B1 | 8/2004 | Thompson |
| 6,779,094 | B2 | 8/2004 | Selkirk et al. |
| 6,823,336 | B1 | 11/2004 | Srinivasan et al. |
| 6,823,436 | B2 | 11/2004 | Krishnamurthy |
| 6,850,929 | B2 | 2/2005 | Chang et al. |
| 6,898,688 | B2 | 5/2005 | Martin et al. |
| 6,915,397 | B2 | 7/2005 | Lubbers et al. |
| 6,928,526 | B1 | 8/2005 | Zhu et al. |
| 6,948,039 | B2 | 9/2005 | Biessener et al. |
| 6,957,362 | B2 | 10/2005 | Armangau |
| 7,072,916 | B1 | 7/2006 | Lewis et al. |
| 7,143,251 | B1 | 11/2006 | Patterson |
| 7,222,194 | B2 | 5/2007 | Kano et al. |
| 7,325,111 | B1 | 1/2008 | Jiang |
| 7,346,623 | B2 | 3/2008 | Prahlad et al. |
| 7,386,695 | B2 | 6/2008 | Fuente |
| 7,428,657 | B2 | 9/2008 | Yamasaki |
| 7,647,355 | B2 | 1/2010 | Best et al. |
| 7,689,633 | B1 | 3/2010 | Li et al. |
| 7,707,184 | B1 | 4/2010 | Zhang et al. |
| 7,814,128 | B2 | 10/2010 | Silvers et al. |
| 7,937,547 | B2 | 5/2011 | Liu et al. |
| 8,037,032 | B2 | 10/2011 | Pershin et al. |
| 8,139,575 | B2 | 3/2012 | Biran et al. |
| 8,150,808 | B2 | 4/2012 | Zha et al. |
| 8,180,740 | B1 | 5/2012 | Stager et al. |
| 8,180,742 | B2 | 5/2012 | Claudatos et al. |
| 8,200,926 | B1 | 6/2012 | Stringham |
| 8,299,944 | B2 | 10/2012 | Provenzano |
| 8,407,191 | B1 | 3/2013 | Nanda |
| 8,417,674 | B2 | 4/2013 | Provenzano et al. |
| 8,706,833 | B1 | 4/2014 | Bergant et al. |
| 8,788,769 | B2 | 7/2014 | Abercrombie et al. |
| 9,098,432 | B1 | 8/2015 | Bachu et al. |
| 9,519,664 | B1* | 12/2016 | Kharatishvili .... G06F 17/30321 |
| 2002/0129214 | A1 | 9/2002 | Sarkar |
| 2003/0101321 | A1 | 5/2003 | Ohran |
| 2003/0140070 | A1 | 7/2003 | Kaczmarski et al. |
| 2004/0167898 | A1 | 8/2004 | Margolus et al. |
| 2004/0199570 | A1 | 10/2004 | Terao |
| 2004/0236801 | A1* | 11/2004 | Borden ............. G06F 17/30575 |
| 2005/0066095 | A1 | 3/2005 | Mullick et al. |
| 2005/0165794 | A1 | 7/2005 | Mosescu |
| 2006/0074945 | A1 | 4/2006 | Mori |
| 2007/0130229 | A1* | 6/2007 | Anglin ............. G06F 17/30017 |
| 2009/0222496 | A1 | 9/2009 | Liu et al. |
| 2010/0088318 | A1* | 4/2010 | Kan ................ G06F 17/30613 |
| | | | 707/741 |
| 2011/0231447 | A1* | 9/2011 | Starkey ............ G06F 17/30575 |
| | | | 707/792 |
| 2011/0258161 | A1 | 10/2011 | Constantinescu et al. |
| 2013/0254479 | A1* | 9/2013 | Czezatke ............ G06F 11/1451 |
| | | | 711/112 |
| 2016/0147814 | A1* | 5/2016 | Goel ................ G06F 17/30368 |
| | | | 707/600 |
| 2016/0328429 | A1* | 11/2016 | Lipcon ............. G06F 17/30315 |
| 2017/0091226 | A1* | 3/2017 | Kharatishvili .... G06F 17/30283 |

OTHER PUBLICATIONS

American Megatrends, Inc., "StorTrends/ManageTrends® (Version 2.7) User's Guide for the StorTends 1300 Storage Appliance" Mar. 23, 2009 (378 pages).

Arrell et al., "Using RVA and SnapShot for Business Intelligence Applications with OS/390 and DB2," IBM, Redbooks, Aug. 1998 (70 pages).

Baird, "Virtual Storage Architecture Guide (VSAG)," IEEE, No Month Listed 1995 (pp. 312-326).

Baker, "Disk-Based Mirroring Is a Lot More Than Just Safe," Computer Technology Review, No Month Listed 2000 (pp. 55-57).

Brown et al., "SnapMirror and SnapRestore: Advances in Snapshot Technology," retrieved online [URL:<<https://web.archive.org/web/20011126183455/http://www.netapp.com/tech_library/3043.html>>] No Date Listed (13 pages).

Cederqvist et al., "Version Management with CVS," No Month Listed 1992 (122 pages).

Chang et al., "Performance Analysis of Two Frozen Image Based Backup/Restore Methods," IEEE International Conference on Electron Information Technology 2005, May 22-25, 2005 (7 pages).

Chapman et al., "SnapMirror® Best Practices Guide," Network Appliance, Inc., Apr. 2006 (63 pages).

Chatterjee et al., "Efficient Replication Leveraging Information Lifecycle Management in Data Storage Systems," Provisional Patent Application No. Not Available, Feb. 9, 2009 (25 pages).

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).

Chutani et al., "The Episode File System," Usenix Association, Proceedings of the Winter 1992 Usenix Conference, San Francisco, California, Jan. 20-24, 1992 (19 pages).

CommVault, "CommVault® Simpana® Quick Recovery® Software for Critical Data Center Applications and File Systems," No Month Listed 2010 (35 pages).

Dantz Development Corporation, "Retrospect® User's Guide," No Month Listed 2002 (262 pages).

Degwekar, "Using SnapMirror® with SnapDrive® for Unix®," No Month Listed 2007 (11 pages).

Delphix Corp.'s Invalidity Contentions Under Patent L.R. 3-3, Jul. 24, 2014 (27 pages).

Edwards et al., "FlexVol: Flexible, Efficient File Volume Virtualization in WAFL," Usenix Association, Usenix '08: 2008 Usenix Annual Technical Conference, No Month Listed 2008 (pp. 129-142).

You et al., "Deep Store: An Archival Storage System Architecture," Proceedings of the 21st International Conference on Data Engineering, No Month Listed 2005 (12 pages).

Zhang et al., "YFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).

EMC, "Backup of Oracle in EMC Symmetrix Environments with EMC NetWorker PowerSnap," Aug. 2008 (25 pages).

Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).

(56) References Cited

OTHER PUBLICATIONS

EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, filed Apr. 14, 2015 (108 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, filed Apr. 14, 2015 (100 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("the '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("the '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).

(56) References Cited

OTHER PUBLICATIONS

Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit 8-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit 8-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advanced Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).

Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http.://www.cs.wisc.edu/~shankar/Viva/viva.html>>]Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrators Guide," Dec. 1999 (166 pages).
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, (2008) (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).

(56) References Cited

OTHER PUBLICATIONS

Muller et al., "A High Performance Multi-Structured File System Design," ACM, No Month Listed (pp. 56-67) 1991.
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManagere® 2.1 for Oracle® Installation and Administration Guide," Apr. 2007 (272 pages).
Network Appliance, Inc., "Data ONTAPT™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).

Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "XFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN vol. Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap™ Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
VMware, "VMware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).
International Search Report and Written Opinion for International Application No. PCT/US15/65282 dated Feb. 25, 2016 (8 pages).

* cited by examiner

| 300 | File Path 302 | File Type 304 | Create Date 306 | Modify Date 308 | Size 310 | Status 312 |

FIG. 3

| Snapshot N-1 | Snapshot N | Merge Result N → N-1 | Notes |
|---|---|---|---|
| ADD/UPDATE | UPDATE1 | UPDATE1 | |
| UPDATE | DELETE | DELETE | Keep DELETE |
| DELETE | ADD/UPDATE | ADD/UPDATE | |
| ADD/UPDATE/DELETE | - | ADD/UPDATE/DELETE | |
| ADD | DELETE | - | Cancels each other |

| Fields on FileMetadata |
|---|
| String directory 1202 |
| String filename 1204 |
| String extension 1206 |
| Integer filetype 1208 |
| Long createdDate 1210 |
| Long modifiedDate 1212 |
| Long size 1214 |
| Integer status 1216 |

FIG. 12

| Fields on BackupMetadata |
|---|
| Long id 1302 |
| String name 1304 |
| String type 1306 |
| Long applicationId 1308 |
| Long clusterId 1310 |
| Long consistencyDate 1312 |
| Long backupDate 1314 |
| Long bermudaId 1316 |
| Long nasserverId 1318 |

FIG. 13

SEARCHING AND INDEXING OF BACKUP DATA SETS

CROSS REFERENCE TO RELATED APPLICATIONS

This invention claims priority under 35 U.S.C. 119(e) to U.S. Provisional Application No. 62/091,220, filed Dec. 12, 2014, entitled "Searching and Indexing of Backup Data Sets," the contents of which are incorporated herein in its entirety.

TECHNICAL FIELD

This invention relates generally to data management. More specifically, this invention relates to a system and method for performing searching and indexing of large backup data sets.

BACKGROUND

Businesses and consumers have large quantities of backed up data at rest. These backups can be automatically created or done manually on demand. In order to efficiently store these large backups they are often compressed or otherwise stored in formats that do not lend themselves to easy browsing or searching or restoring subsets of the backup. In addition, their sheer size makes these tasks challenging.

SUMMARY OF THE INVENTION

Embodiments of the present disclosure relate to systems and methods of providing search capabilities for data backups by indexing multiple time-based versions of the data backups such that the multiple time-based versions of each of the data backups are factored into a search result. In some embodiments, first data associated with a first backup of a data set is received, the first data including a list of changes associated with the data set between a first point in time associated with the first backup and a second point in time associated with a second backup, the second point in time being prior to the first point in time, the data set being located on a customer application server and being protected by a data management system. In some embodiments, for each of the first backup, second backup and one or more intermediary backups an index representative of difference data is created, the difference data associated with changes in the data set between each of the first backup, the second backup and the one or more intermediary backups, and a corresponding prior backup most recent in time to each of the first backup, second backup and the one or more intermediary backups, each intermediary backup occurring at an associated intermediary point in time occurring between the first backup and the second backup. In some embodiments, second data associated with a search request is received, the search request including an attribute of the data set, the attribute of the data set including a file within the data set and at least one backup time associated with the file. In some embodiments, a version of the file associated with the at least one backup time associated with the file is retrieved, wherein retrieving the version of the file comprises generating the version of the file by combining the difference data from each of the indices associated with the at least one backup time and intermediary backup times between the at least one backup time and the second point in time, thereby providing search capabilities for data backups by indexing data backups at a plurality of backup times such that multiple versions of each of the data backups are factored into a search result.

In some embodiments, the attribute of the data set further comprises at least one of a file name associated with the file, a directory name associated with a directory, a backup name associated with a backup, date ranges associated with the file and the backup, and file metadata associated with the file. In some embodiments, the list of changes include changes to at least one of a file path associated with the file, file type associated with the file, creation date associated with the file, modification date associated with the file, file size associated with the file, and file status associated with the file. In some embodiments, file status includes at least one of the file being created, the file being deleted, file content associated with the file being modified, and metadata associated with the file being modified.

In some embodiments, each index includes a status associated with the difference data, the status including at least one of a no change operation, an add operation, an update operation, and a delete operation. In some embodiments, combining indices comprises combining the status for each index across the backup times. In some embodiments, the systems and methods described herein further include receiving a request associated with expiring a third backup. In some embodiments, when the third backup comprises one of the second backup or an intermediary backup, merging difference data associated with an index of a fourth backup that is most recent in time after the third backup into difference data of an index associated with the third backup. In some embodiments, when the third backup comprises the first backup, and the request to expire the third backup is received at a request time after the first point in time and before a backup point in time associated with the fourth backup, the fourth backup being taken after the first point in time, disabling search capability of an index associated with the first backup, receiving a request associated with a backup for the fourth backup at the fourth backup point in time, and merging, at the computing device, difference data associated with an index of the fourth backup into difference data associated with an index associated with the third backup.

In some embodiments, the merged difference data comprises a first update operation, when the difference data associated with the third backup index includes one of the add operation or a second update operation and the difference data associated with the fourth backup index includes the first update operation; a delete operation, when the difference data associated with the third backup index includes the update operation and the difference data associated with the fourth backup index includes the delete operation; and a no change operation, when the difference data associated with the third backup index includes the add operation and the difference data associated with the fourth backup index includes the delete operation.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 3 is a chart detailing the changelist referenced in FIG. 2.

FIG. 11 is a table illustrating merge rules during expiration, according to some embodiments of the present disclosure.

FIG. 12 is a table shows indexed FileMetadata document details, according to some embodiments of the present disclosure.

FIG. 13 is a table shows indexed BackupMetadata document details, according to some embodiments of the present disclosure.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Some of the embodiments described herein provide for an efficient mechanism for searching and browsing multiple versions of large dataset backups. A search appliance receives changelists from application and file system backup processes and stores information about the files in searchable indices.

The specific algorithms utilized for storing and querying the backup data allow for fast indexing, space-efficient storage and fast searching and browsing of arbitrarily large backup data sets. They also provide for the removal of backups and their indexed data in an efficient manner.

Figure 1:
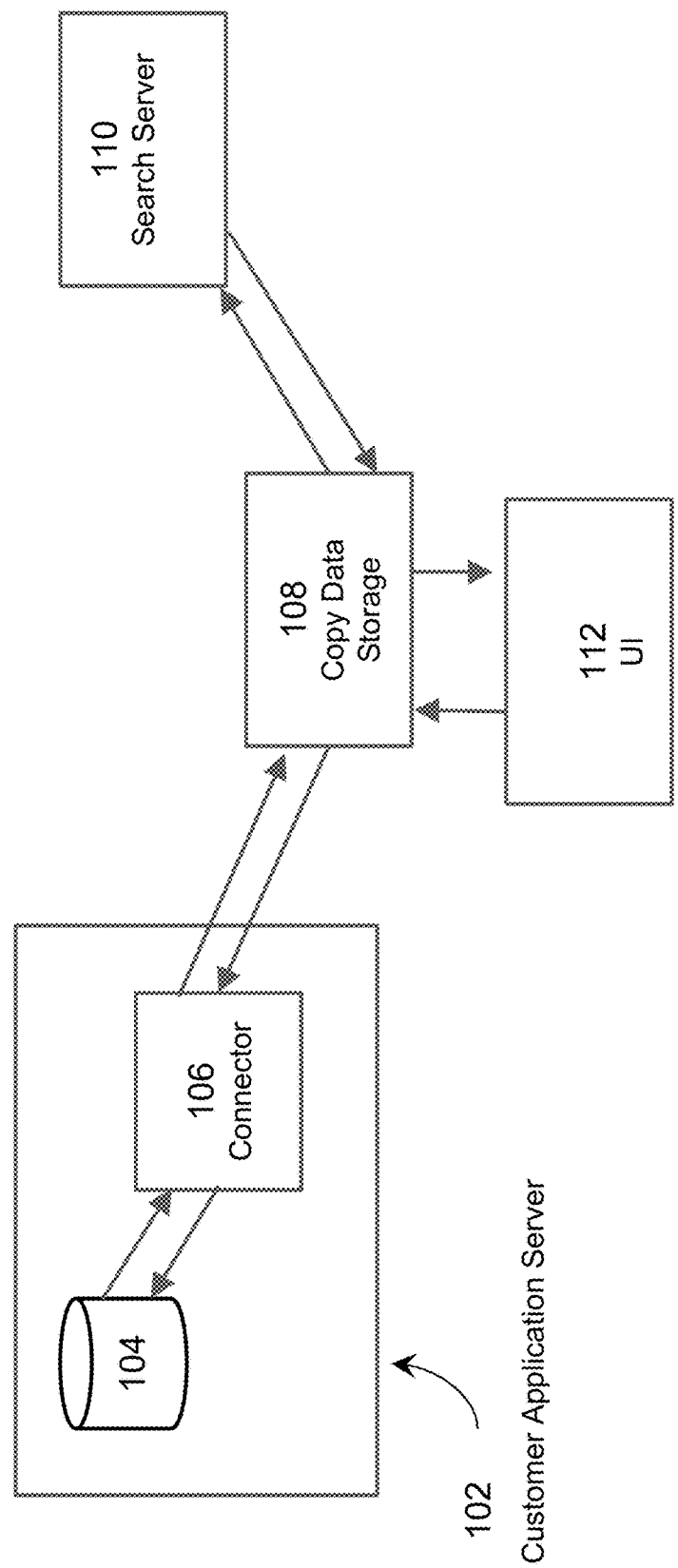
FIG. 1 is a diagram of an overall system architecture for searching, indexing and expiring data, as described in some embodiments of the present disclosure.

FIG. 1 is a diagram of an overall system architecture for searching, indexing and expiring data, as described in some embodiments of the present disclosure. FIG. 1 shows a customer application server 102, customer data source 104, Connector 106, Copy Data Storage (CDS) 108, search server 110, and a user interface (UI) 112.

Customer application server 102 is a server containing data that the customer wants protected. Customer application server 102 includes a customer data source 104, and a connector 106. Customer data source 104 can include data stored on a virtual machine (VM), NAS Server, file system, database, etc.

Connector 106 is software on customer application server 102. Connector 106 is used to protect data source 104. Connector 106 communicates with the CDS 108 and performs the backups on the customer applications. It also generates the changelists for the search server 110. CDS 108 uses the network to communicate with the Connector and the search server 110.

CDS 108 contains a scheduler for protecting customer applications and acts as a point of communication between the UI 112, the Connector 106, and the search application 112. The scheduler is used to determine when to perform backups or expire backups based on schedules set by the end-user. The CDS 108 is the central point of communication for the UI 112, the connector 106 and the search server 110.

Search server 110 is a search application used to browse and search the contents of the backups of the customer data source 104. It may be a single physical or virtual server or a cluster of physical and/or virtual servers.

User interface 112 is either a graphical or command-line interface that an end-user uses to interact with CDS 108. As explained in more detail below, an end-user, through user interface 112, can either send HTTP commands or enter full or portion of the filename or directory or pattern as an input in GUI to search for matching files or backups containing matching files.

Figure 2:
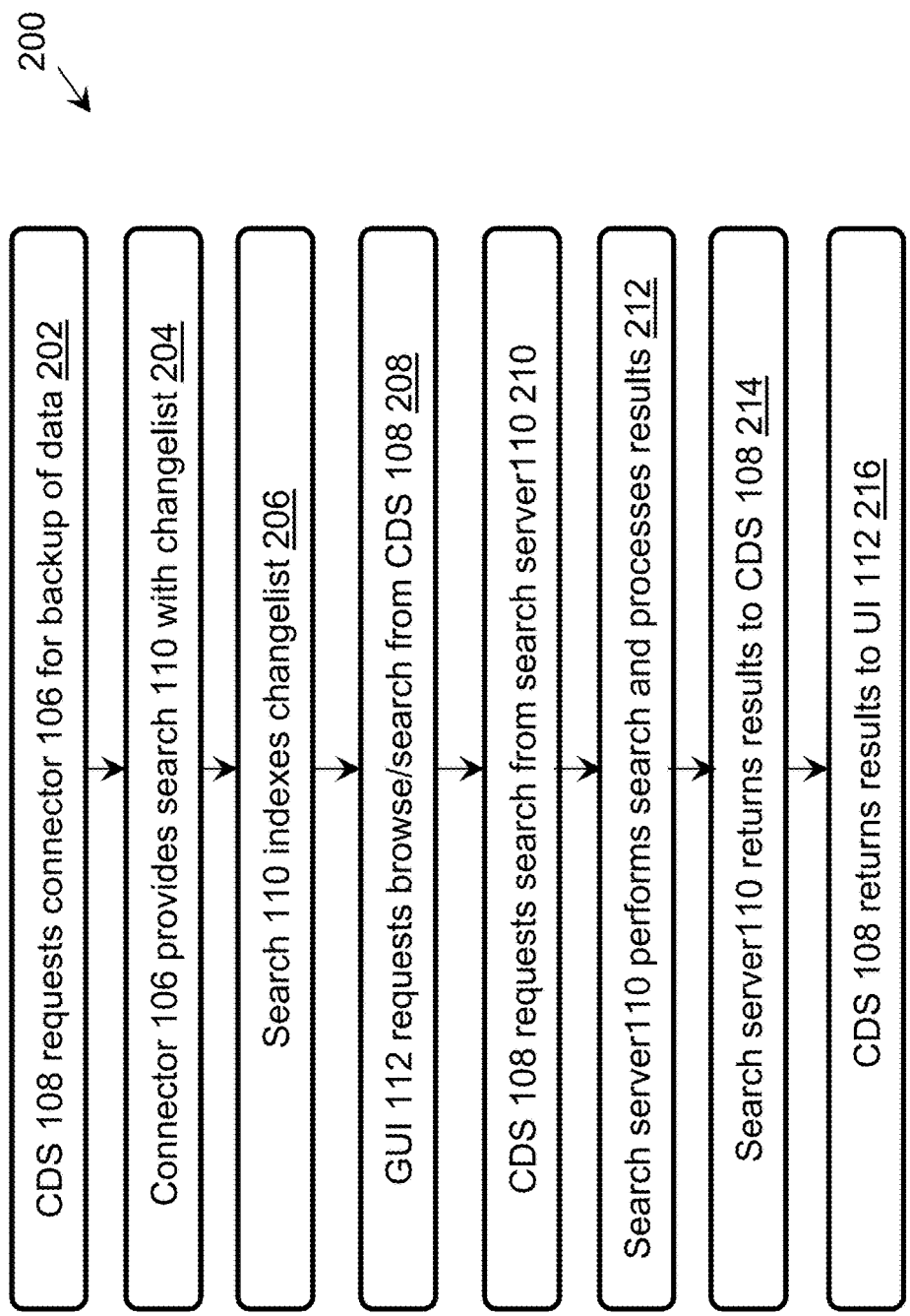
FIG. 2 is a flowchart illustrating searching and indexing data, as described in some embodiments of the present disclosure.

FIG. 2 is a flowchart illustrating searching and indexing data, as described in some embodiments of the present disclosure.

A search and indexing process 200 begins with CDS 108 sending a request to the Connector 106 for a backup of customer data 104 (process 202). The request can include any information required to back up the data source. The request can include information about the backup request such as the location of the data or the information identifying the application. This can include the server containing the application or data, file paths on the server, or identifying names of applications. It can also include information required to perform the backup such as what to include/exclude, logins, whether to truncate application logs after the backup, etc.

Next, as part of the backup, Connector 106 provides search server 110 with a changelist 204. Briefly, a changelist is a list of files that have changed since the last backup. Changelist is described in more detail in FIG. 3.

After receiving the changelist, search server 110 indexes the changelist 206. As described in more detail in FIG. 4, indexing the changelist includes iterating through the changelist and creating an incremental index of changes to the files and an alias of the contents of the entire backup.

When UI 112 receives a search request from an end user, it requests browse/search of the backup from CDS 108 208. Browse/search process can include information about the backup/application to be searched. It can also include information such as file names or patterns, directory names or patterns, date ranges of files or backups, specific backups, and file metadata.

Next, CDS 108 makes a search request to search server 110 (210). CDS 108 transforms the UI 112 request into the search syntax used by the search server 110. In some embodiments, search syntax may include language defining exact or fuzzy matching of text fields such as file names or paths including the use of wildcards or regular expressions. It can also include date ranges and Boolean logic to combine search terms.

Search server 110 performs a search based on the search syntax, and processes the result (212). Processing of the result includes transforming the search results from a historical view of each files' lifecycle into a representation of the contents of each backup. Search server 110 then aggregates each of the results from each backup into a single search result set.

After processing the results, search server 110 returns the results to the CDS 108 (214). As described in more detail below, processing the results includes transforming the results into user-friendly formats, and in the case of large result sets, providing pagination to the CDS 108 so that it can fetch reasonable portions of the results across the network incrementally.

CDS 108 then returns the search results to UI 112 (216). CDS 108 sends the results to the UI 112 in a format that allows the UI to present the results to the end-user in a variety of formats, such as a list view or a file system hierarchy and to enable sorting or filtering.

FIG. 3 is a table detailing the changelist referenced in FIG. 2. FIG. 3 shows file path 302, file type 304, create date 306, modify date 308, size 310 and status 312.

The changelist 300 includes information detailing the changes to the contents of the backup as compared to the previous backup. File path 302 refers to a file path of a file associated with the backup. File type 304 can be a file, directory, or symbolic link. Create date 306 refers to a creation date of the file as reported by an underlying file system. Modify date 308 refers to a modification date of the file as reported by an underlying file system. Size 310 refers to a number of bytes associated with a file as reported by an underlying file system. Status 312 refers to operations associated with a file, such as creation, deletion, content modification, or metadata modification.

In some embodiments, if a file is unchanged from the prior backup, it does not appear in the changelist. The list contains following information on the files involved, including the file's path on the file system, the file metadata as provided by the file system (size, create date, modify date and Access Control List) and the nature of the change to the file. In some embodiments, there are four types of changes that can be reported: created, contents changed, metadata changed and deleted.

Created indicates that the file did not exist in the prior backup but exists in the current backup.

Contents changed indicates that the contents of the file have changed since the prior backup.

Metadata changed indicates that the file metadata has changed (Access Control List such as owner, groups, permissions, etc.) but not the contents of the file. If both the contents and the metadata have changed, contents changed is reported.

Deleted indicates that the file existed in the prior backup but does not exist in the current backup. In this case, the file metadata reported in the changelist is empty.

Figure 4:
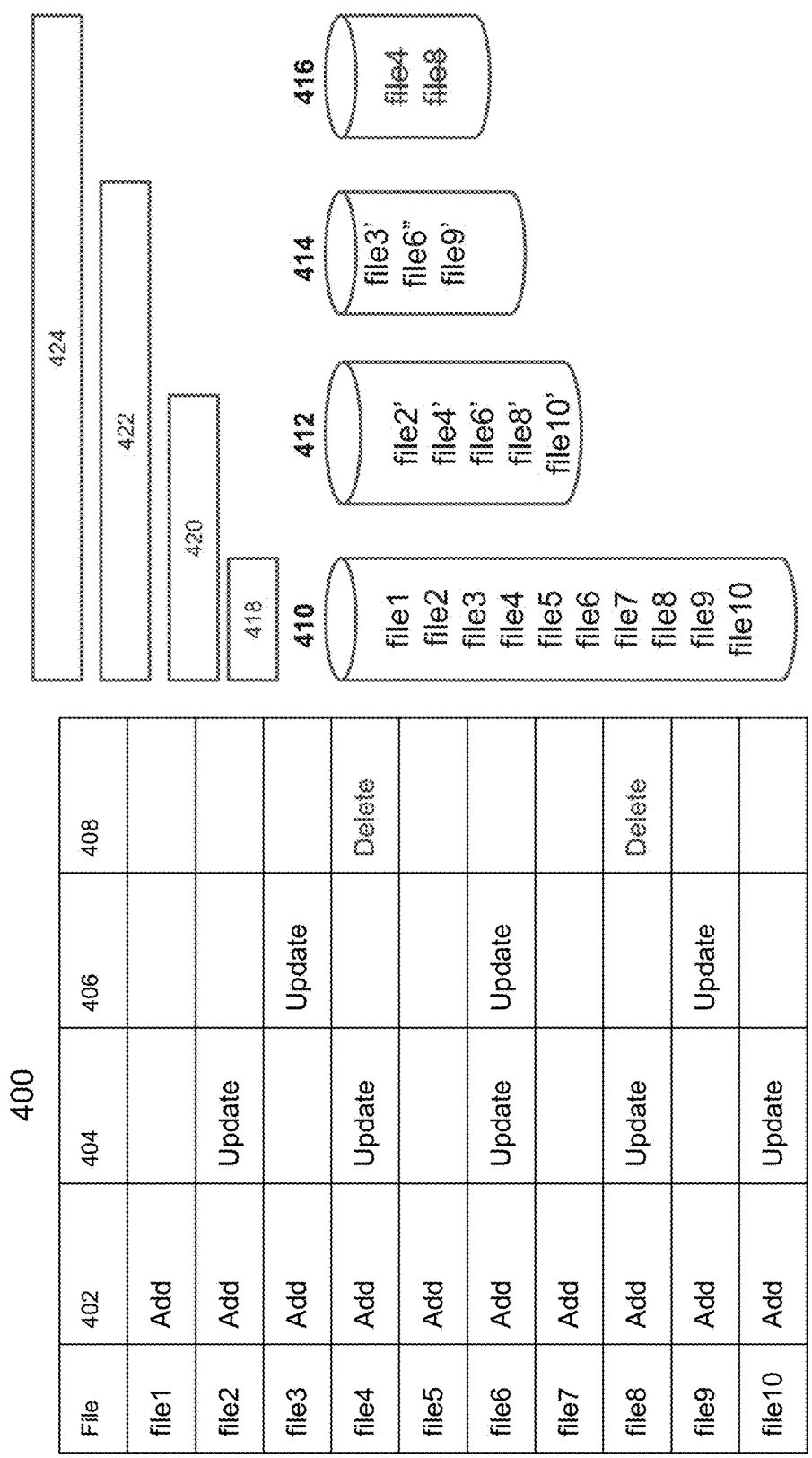
FIG. 4 is a diagram illustrating how the contents of backup are spread across incremental indices and then exposed through virtual indices that span the physical indices, according to some embodiments of the present disclosure.

FIG. 4 is a diagram illustrating how the contents of backup are spread across incremental indices and then exposed through aliases that span the physical indices, according to some embodiments of the present disclosure. Table 400 includes a list of files and their changes across four backups 402, 404, 406 and 408. FIG. 4 also shows indexed data in four indices 410, 412, 414 and 416. FIG. 4 also shows four aliases 418, 420, 422 and 424.

In table 400, there are 10 files that change across four backups. In 402, the first backup, since there are no previous backups, all of the files appear as being added. All of these files are indexed into index 410. Alias 418 is created to represent index 410.

In backup 404, five files are updated. The changelist contains only these files, each marked as changed. Only these files are indexed into index 412. Alias 420 is created and contains both physical indices 410 and 412 to represent the entire backup.

In backup 406, three additional files are updated. The changelist contains only these files, each marked as changed. These three files are indexed into index 414. Alias 422 is created and spans the physical indices 410, 412, and 414.

In backup 408, two files are deleted. The changelist contains these two files marked as deleted. Index 416 is created with these two files. Alias 424 is created and contains physical indices 410, 412, 414, and 416 to represent all of the files in that backup.

Figure 5:
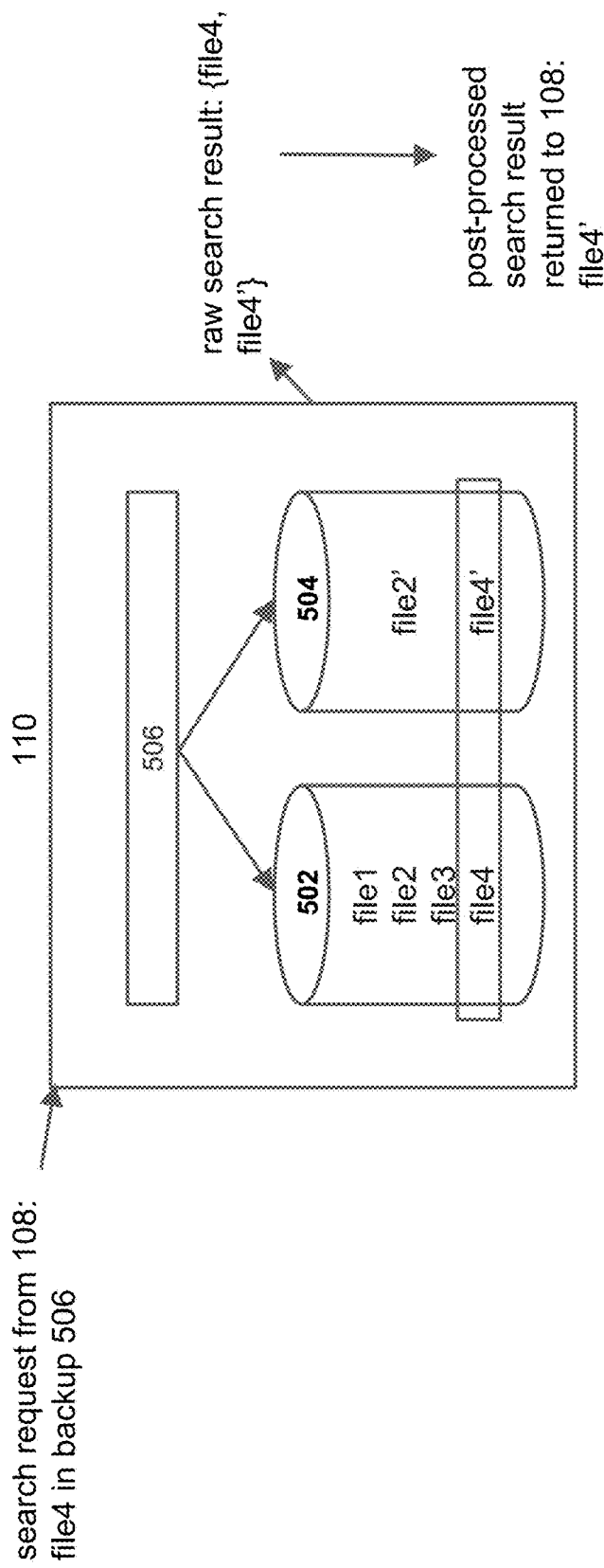
FIG. 5 is a diagram illustrating how a search is performed across incremental indices, according to some embodiments of the present disclosure.

FIG. 5 is a diagram illustrating how a search is performed across incremental indices, according to some embodiments of the present disclosure. FIG. 5 shows search server 110, two indices 502 and 504, and one alias 506.

Search server 110 receives a request to search for file4 within the backup represented by the alias 506. Alias 506 includes data in indices 502 and 504. Index 502 includes files file1, file2, file3 and file4. Index 504 includes file2', the changed version of file2, and file4', the changed version of file4. If a search request is looking for file4, the search result will use alias 506 and return the results file4 from index 502 and file4' from index 504; showing file4' as a later version of file4. The post-processing looks at these results and determines that since file4' is the most recent version of file4, then it is the version that is found in the backup represented by 506. The search server returns file4' as the result to the CDS 108.

Figure 6:
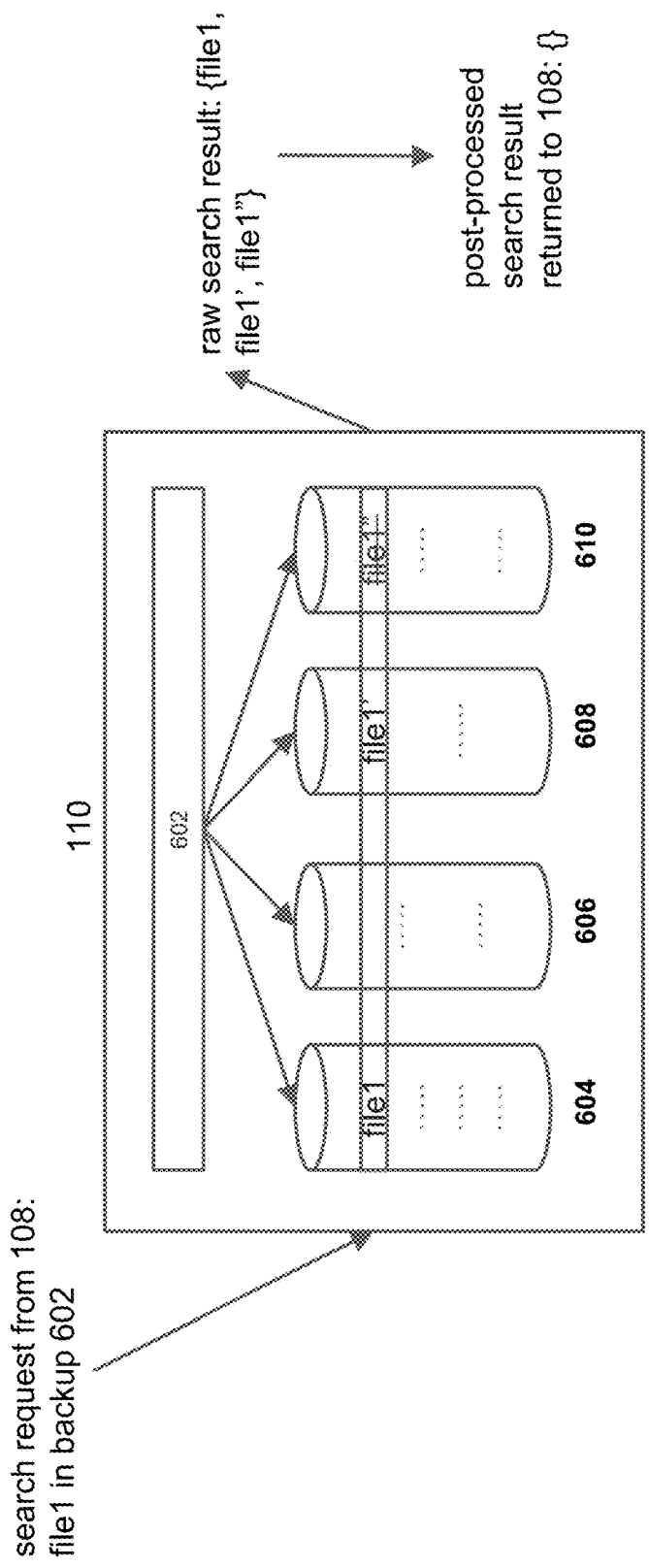
FIG. 6 is a diagram illustrating a search across incremental indices when a file has been deleted, according to some embodiments of the present disclosure.

FIG. 6 is a diagram illustrating a search across incremental indices when a file has been deleted, according to some embodiments of the present disclosure. FIG. 6 shows search server 110, alias 602, and indices 604, 606, 608, and 610.

Search server 110 includes alias 602 and indices 604 606 608 610. Index 604 contains entry file1 and index 608 contains entry file1', which, in some embodiments, is a later version of file1. Index 610 contains entry file1" that lists the file as deleted. Alias 602 represents a backup that spans all four indices 604 606 608 610.

When search server 110 receives a request to locate file1 in the backup represented by alias 602, search server 110 searches alias 602 and will locate three results. The results are file1 from 604, file1' from 608 and file1" from 610. Post processing examines the timeline of file1, file1', and file1" and determines that since file1" is created latest in time and that it shows a delete. Post processing determines that file1 does not exist in the backup. An empty search result is returned to CDS 108. Post processing looks at the results from aliases that may contains multiple version of the FileMetadata. It aggregates the FileMetadata based on the file system path and sort it based on index timeline. If the last FileMetadata in the aggregated list has status as DELETED, then post processing determines that the file no longer exists from the corresponding alias and forward. An empty search result is returned, otherwise the latest version of the FileMetadata is returned.

Figure 7:
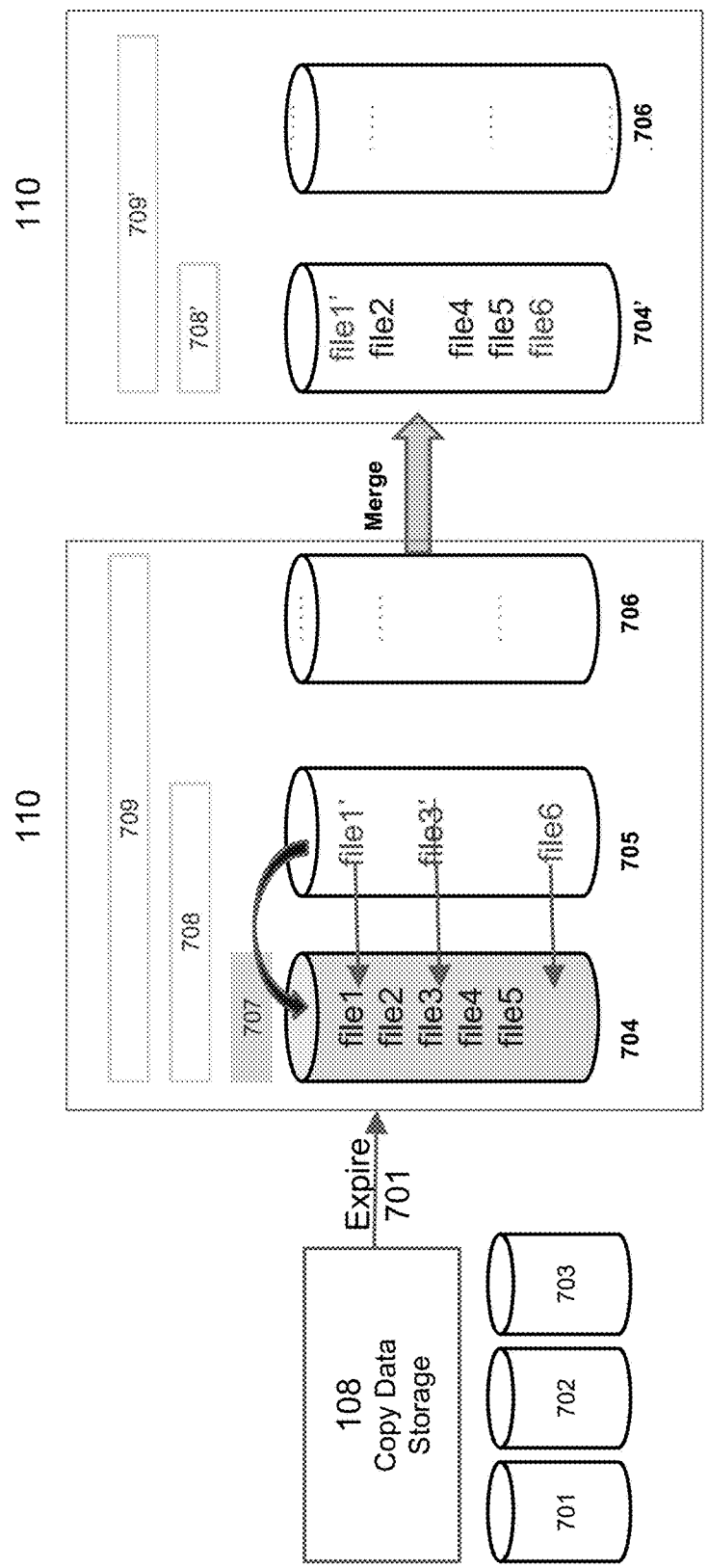
FIG. 7 is a diagram and table illustrating expiration of the oldest backup, according to some embodiments of the present disclosure.

FIG. 7 is a diagram and table illustrating expiration of the oldest backup, according to some embodiments of the present disclosure. FIG. 7 shows three indices 704 705 706 and three aliases 707 708 709 corresponding to three backups: 701 702 703. FIG. 7 also shows merged indices 704' and merged aliases 708' and 709'.

The 704 index corresponds to the oldest backup 701, 705 index corresponds to second backup 702, and 706 index corresponds to the newest backup 706. The first alias 707 is mapped to only one index: the first index 704. Second alias 708 is mapped to indices 704 and 705. The last alias 709 is mapped to all three indices: 704, 705 and 706.

When CDS 108 sends an expire request for the oldest backup 701, the system avoids moving the documents from the largest index 704. Instead, the documents from the next index 705 are merged to index 704. The process for merging the indexed documents is described in detail in FIG. 11. In some embodiments, an expire request corresponds to the request to delete the backup. This could be initiated by the user or by the scheduler on CDS 108 based on the protection policy for the application. The protection policy dictates when the backup image should be removed.

After the merge is successful, index 704' contains all the updated document versions from index 705. Index 705 is then deleted and the corresponding alias for backup 702 namely alias 707 is also deleted. The final result contains two indices, 704' and 706 and two aliases 708' and 709'.

Figure 8:
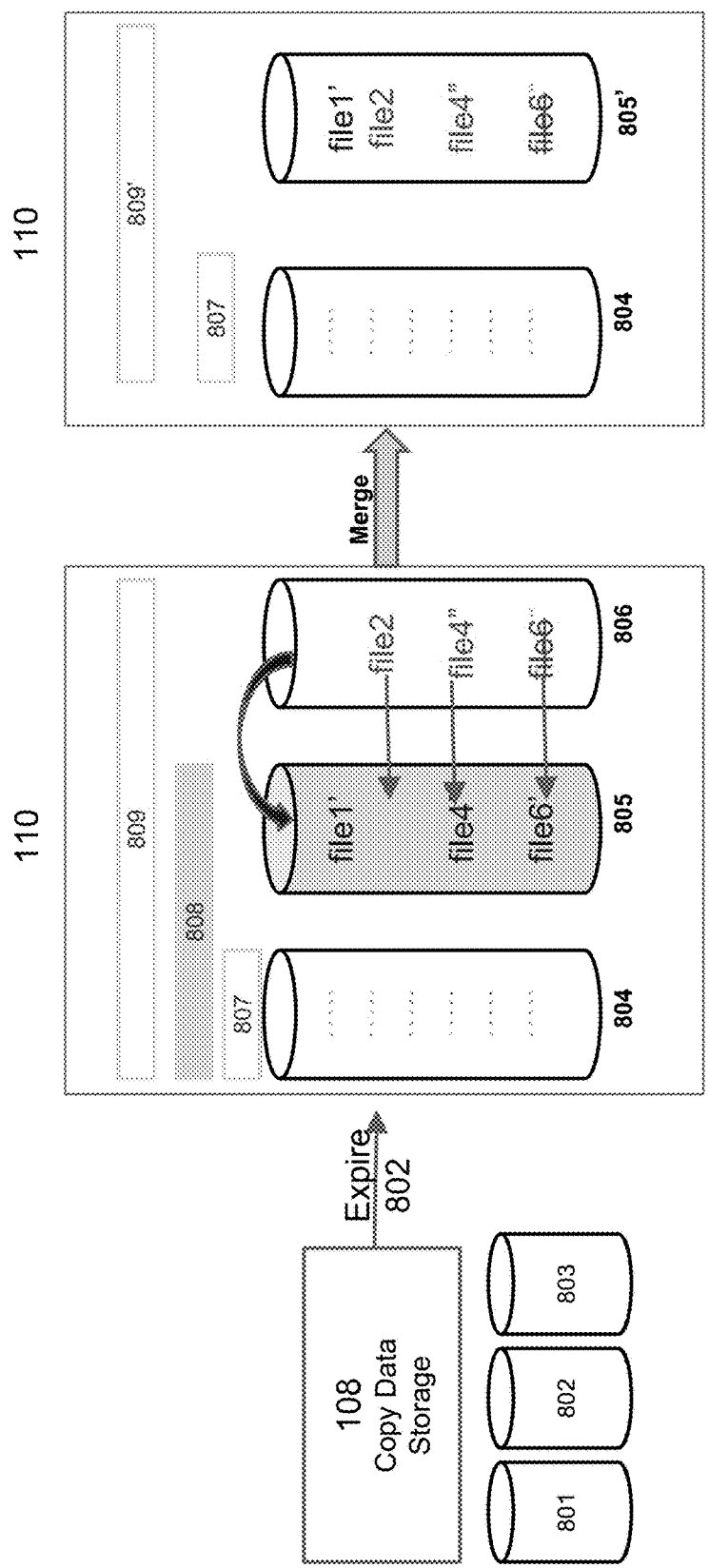
FIG. 8 is a diagram and table illustrating expiration of a middle backup, according to some embodiments of the present disclosure.

FIG. 8 is a diagram and table illustrating expiration of a middle backup, according to some embodiments of the present disclosure. FIG. 8 shows three indices 804 805 806 and three aliases 807 808 809 corresponding to three backups: 801 802 803. FIG. 8 also shows merged indices 805' and merged alias 809'.

Reference character 804 indicates the index for the oldest backup 801, 805 is the index for the second backup 802 and 806 is the index for the newest backup 803. The first alias 807 is mapped to only one index 804. The second alias 808 is mapped to indices 804 and 805. The newest alias 809 is mapped to all three indices: 804, 805 and 806.

Similar to expiring the oldest backup, when search receives expire request for the middle backup 808, the documents from index 806 corresponding to backup 809 are merged into index 805. After the merge is successful, index 805' contains all the updates from index 806. Index 806 is deleted along with expiring backup alias 808. The final result contains two indices, 804 and 805' and two aliases 807 and 809'. Alias 807 is still mapped to index 804 as before. However, alias 809' is now mapped to indices 804 and updated index 805'.

Figure 9:
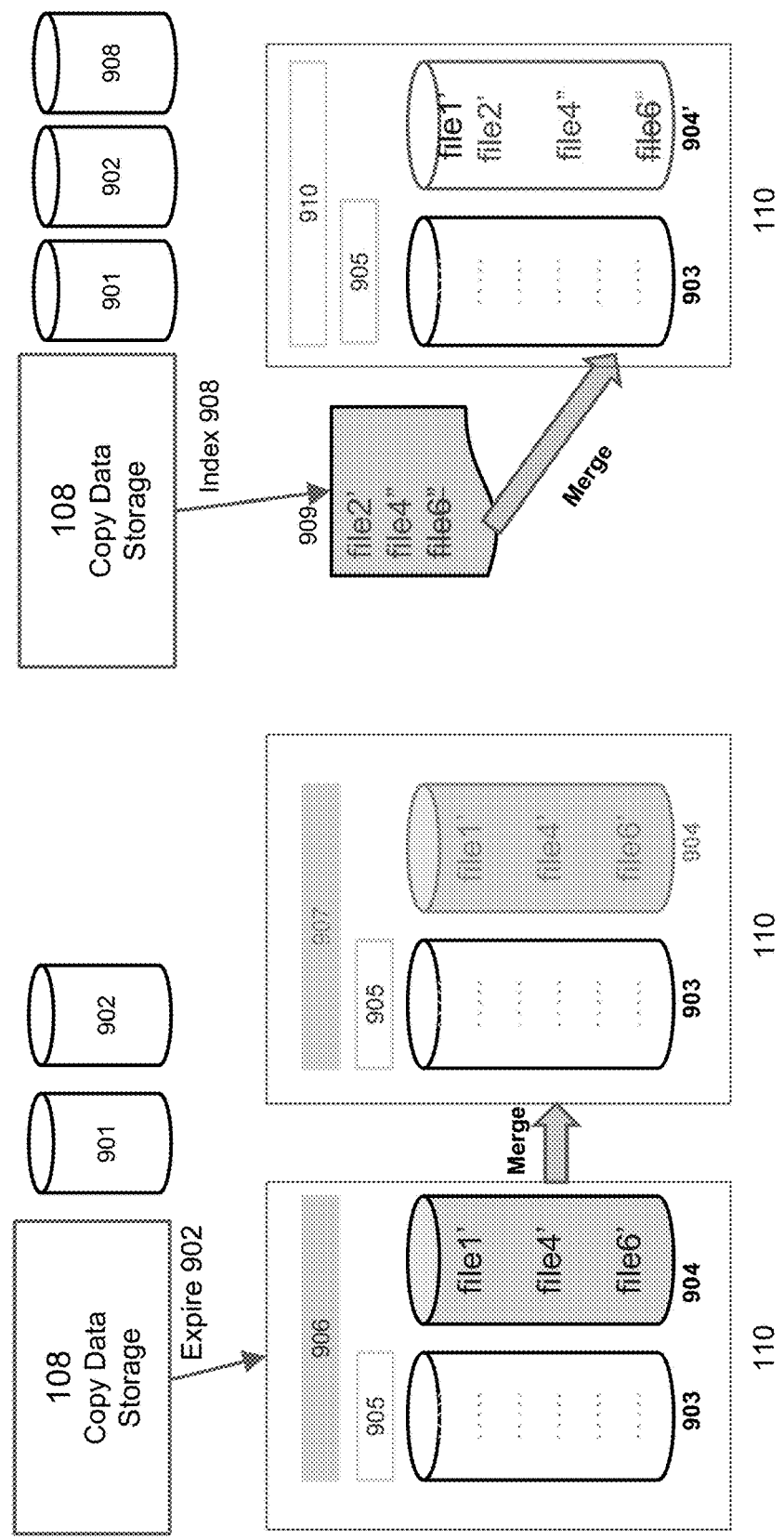
FIG. 9 is a diagram and table illustrating expiration of the newest backup, according to some embodiments of the present disclosure.

FIG. 9 is a diagram and table illustrating expiration of the newest backup, according to some embodiments of the present disclosure. FIG. 9 shows two indices 903 904 and two aliases 905 906 corresponding to two backups: 901 902. FIG. 9 also shows virtual alias 907, alias 910 merged index 904' and backup 908.

Index 903 is the oldest index and index 904 is the newest index. The first alias 905 is mapped to only one index 903. The second alias 906 is mapped to both indices 903 and 904.

As described in more detail in U.S. application Ser. No. 12/947,513, filed Nov. 16, 2010, entitled "System and Method for Creating Deduplicated Copies of Data by Sending Difference Data Between Near-Neighbor Temporal States," which is herein incorporated by reference in its entirety, backups subsequent to a first backup are incremental. Since backups are incremental except for the first backup 901, the second backup 902 index 904 contains only the changes made after the first backup 901 index 903. When expiring the newest backup 902, the corresponding index 904 cannot be deleted. Index 904 cannot be deleted because the next backup will only contain the changes made after 904 and the changes in 904 will be lost if it is deleted. The same rule applies when there is only one backup to be expired.

In this case, the expiring backup index 904 is kept until a new backup is available for indexing. However, the documents in this index should not be searchable. Therefore its alias 906 is removed from the searchable aliases and marked as a virtual alias 907. When search server 110 receives a request for a new backup 908, the new document changelist 909 is merged into index 904'. Therefore index 904' contains its original changes with updates from the new changelist 909. The updated index 904' is added back to a searchable alias 910.

Figure 10:
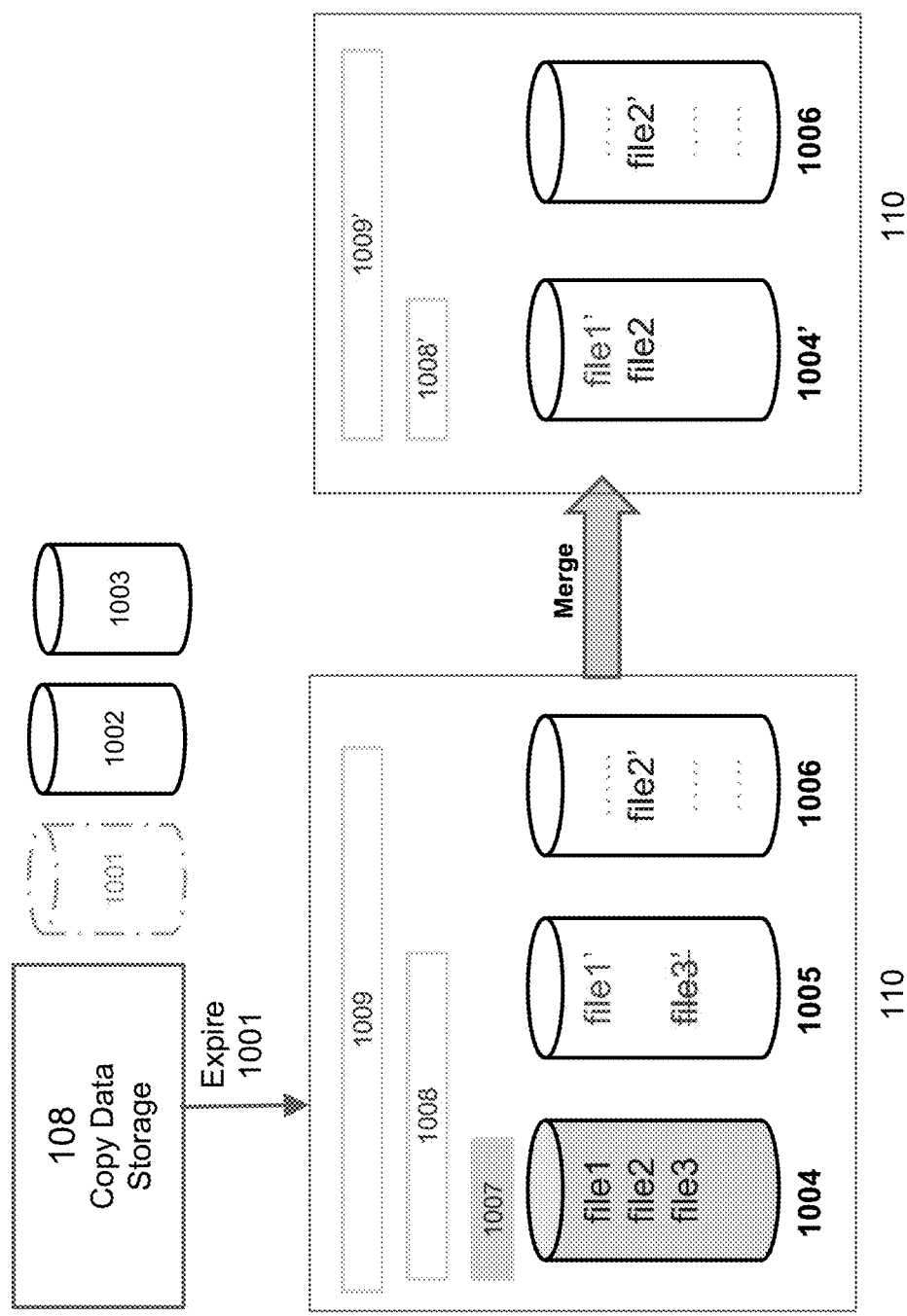
FIG. 10 is a diagram illustrating search results before and after expiring a backup, according to some embodiments of the present disclosure.

FIG. 10 is a diagram illustrating search results before and after expiring a backup, according to some embodiments of the present disclosure. FIG. 10 shows three indices 1004 1005 1006 and three aliases 1007 1008 1009 corresponding to three backups: 1001 1002 1003. FIG. 10 also shows merged index 1004' and merged aliases 1008' and 1009'.

The first backup index 1004 contains 3 documents file1, file2 and file3. The second backup index 1005 contains file1' which is a newer version of file1 and the deleted marker file3' for file3. The third backup index 1006 contains file2' which is a newer version of file2.

When user searching for backups matching document file1, search server will looks for it in the latest alias 1009. Alias result will include index 1004, file1 and index 1005, file1' The post processing looks at these results and determines that file1 was added in index 1004 but never deleted. It will find all the indices and their corresponding backups. Therefore the final result after post processing will contain all 3 backups: 1001, 1002 and 1003.

Similarly, searching for backups containing file3 returns only backup 1001 since file3 was deleted in backup 1002. Only a delete marker for file3 is present in the second index 1005.

When the oldest backup 1001, expires, documents from index 1005 are merged into index 1004 so that all the latest versions of documents are preserved. Since document file3 was added in backup 1001, then deleted in backup 1002, expiring backup 1001 eliminates file3. As shown in FIG. 10, the end merge result in index 1004' does not contain file3.

A user searching for backups containing file1 gets the result with only two backups: 1002 and 1003. Similarly, searching for backups containing file3 returns an empty result because the backup 1001 containing file3 has already been expired.

FIG. 11 is a table illustrating merge rules during expiration, according to some embodiments of the present disclosure. FIG. 11 shows merge rules for different versions of the same document between two indices. Snapshot N is a newer version of the index and snapshot N−1 is a prior version of the index. The documents are merged from the recent index into the previous index.

There are 3 indexing statuses for a document, ADD, UPDATE and DELETE. When a document is first seen for indexing, its status is ADD. For an existing document, if its content or metadata has been modified, its status is considered an UPDATE. When a document is deleted, its status is DELETE. ADD and DELETE are markers that show the life cycle of a document.

When merging two versions of a document, the most recent version always wins except in a special case of merging ADD and DELETE.

Referring to 1102, when snapshot N−1 is associated with ADD/UPDATE and snapshot N is associated with UPDATE1, the merged result of N into N−1 is associated with UPDATE1.

Referring to 1104, when snapshot N−1 is associated with UPDATE and snapshot N is associated with DELETE, the merged result of N into N−1 is associated with DELETE. The DELETE version is kept for reference, as described above.

Referring to 1106, when snapshot N−1 is associated with DELETE and snapshot N is associated with ADD/UPDATE, the merged result of N into N−1 is associated with ADD/UPDATE.

Referring to 1108, when snapshot N−1 is associated with ADD/UPDATE/DELETE and snapshot N is associated with no action, the merged result of N into N−1 is associated with ADD/UPDATE/DELETE.

Referring to 1110, when snapshot N−1 is associated with ADD and snapshot N is associated with DELETE, the two operations cancel each other out and the merged result is associated with no action.

FIG. 12 is a table shows indexed FileMetadata document details, according to some embodiments of the present disclosure. FIG. 12 shows string directory 1202, string filename 1204, string extension 1206, integer filetype 1208, long createdDate 1210, long modifiedDate 1212, long size 1214 and integer status 1216.

FIG. 12 shows a detailed view of an indexed document for a backup. In some embodiments, there are 2 kinds of documents captured during indexing; FileMetadata and BackupMetadata. In some embodiments, a FileMetadata contains the file's path on the filesystem broken down into the subparts; directory, filename and an extension. It can also contain other metadata provided by the file system such as size, created date and modified date.

One index for a backup may contain many filemetadatas. In some embodiments, the number of FileMetadatas directly corresponds to the number of changes in the changelist provided by the Connector. Files that has been added, updated or deleted are recorded in the change set. The four types of status from the changelist can be converted to corresponding integer for indexing. Files that are seen for the first time by the Connector can be indexed with status 1—ADDED. Either the content of the file or its metadata has been changed then it indexed with status 3—CONTENT MODIFIED or 4 METADATA MODIFIED. When the file is deleted, it can be indexed as status DELETE. DELETE is a special marker and it signifies that the life cycle of that file has ended. The file's path is broken down into three subparts; directory, filename and extension. Directory is the path of the parent and filename is the name of the file without extension. Extension is indexed separately. This is designed to optimize the searching based on certain extension e.g. *.txt. The type of file is also indexed as 1 for file, 2 for directory, 3 for symbolic link and 4 for any other types of file. Other file metadata such as created date, modified date and size of the file are also indexed.

String directory 1202 refers to a file path associated with a parent directory of the file. String filename 1204 refers to a name of a file or a directory. String extension 1206 refers to an extension for a file. An integer filetype 1208 can include a file, directory, or symbolic link. Long createdDate 1210 refers to a date from a file system associated with when a file was created. Long createdDate 1210 can be represented in a number of seconds since "the epoch" time which is Jan. 1, 1970, 00:00:00 GMT. Long modifieddate 1212 refers to a date from the file system associated with when the file was last modified. Long modifiedDate 1212 can be represented in a number of seconds since "the epoch" time which is Jan. 1, 1970, 00:00:00 GMT. Long size 1214 refers to a number of bytes associated with the file type, if available. In some embodiments, if the number of bytes is not available, then −1 is designated in this field. Integer status 1216 can include ADDED, DELETED, CONTENT MODIFIED, and METADATA MODIFIED FIG. 13 is a table shows indexed BackupMetadata document details, according to some embodiments of the present disclosure. FIG. 13 shows Long id 1302, string name 1304, string type 1306, long applicationId 1308, long clusterId 1310, long consistencyDate 1312, long backupDate 1314, long bermudaId 1316, and long nasserverId 1318. FIG. 13 shows a detailed view of an indexed document for a backup. There can be two kinds of documents captured during indexing.

In some embodiments, a BackupMetadata contains detailed information about the backup. It can have an id of a backup, name of the backup image and a type of a backup. In some embodiments, the dates backup date and consistency dates can be represented in number of seconds that have elapsed since epoch time, e.g., Jan. 1, 1970. ID 1302 refers to an ID of a backup. Name 1304 refers to a name of a backup image. Type 1306 refers to a type of backup, such as a snapshot, dedup, or remote dedup. ApplicationId 1308 refers to an identifier of the dataset that is being backed up. In some embodiments, the application is frozen for a short period to take the backup and the date is considered consistencyDate 1312. ClusterId 1310 is an identifier associated with a cluster for CDS 108. ConsistencyDate 1312 refers to a date when an application is frozen to take a backup. ConsistencyDate 1312 can be represented in a number of seconds since "the epoch" time which is Jan. 1, 1970, 00:00:00 GMT. BackupDate 1314 refers to a date when the backup is completed. BackupDate 1314 can be represented by a number of seconds since "the epoch" time which is Jan. 1, 1970, 00:00:00 GMT. BermudaID 1316 refers to an identifier associated with a search server. NasserverId 1318 refers to an identifier associated with a customer application server 102. For example, NasserverId 1318 can refer to an identifier associated with a network attached storage (NAS) server which includes a NAS dataset. Since the customer application server can be a large server, its data is broken down to a manageable data set to be protected by CDS 108.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method of providing search capabilities for data backups by indexing multiple time-based versions of the data backups such that the multiple time-based versions of each of the data backups are factored into a search result, the method comprising:

receiving, at a computing device, first data associated with a first backup of a data set, the first data including a list of changes associated with the data set between a first point in time associated with the first backup and a second point in time associated with a second backup, the second point in time being prior to the first point in time, the data set being located on a customer application server and being protected by a data management system;

creating, at the computing device, for each of the first backup, second backup and one or more intermediary backups an index representative of difference data, the difference data representative at least of changes to content of files in the data set between each of the first backup, the second backup and the one or more intermediary backups, and a corresponding prior backup most recent in time to each of the first backup, second backup and the one or more intermediary backups, each intermediary backup occurring at an associated intermediary point in time occurring between the first backup and the second backup;

receiving, at the computing device, second data associated with a search request, the search request including an attribute of the data set, the attribute of the data set including a file within the data set and at least one backup time associated with the file; and retrieving, at the computing device, a version of the file associated with the at least one backup time associated with the file, wherein retrieving the version of the file comprises generating the version of the file by combining the difference data from each of the indices associated with the at least one backup time and intermediary backup times between the at least one backup time and the second point in time, thereby providing search capabilities for data backups by indexing data backups at a plurality of backup times such that multiple versions of each of the data backups are factored into a search result.

2. The computerized method of claim 1, wherein the attribute of the data set further comprises at least one of:
a file name associated with the file,
a directory name associated with a directory,
a backup name associated with a backup,
date ranges associated with the file and the backup, and
file metadata associated with the file.

3. The computerized method of claim 1, wherein the list of changes include changes to at least one of:
file path associated with the file;
file type associated with the file;
creation date associated with the file;
modification date associated with the file;
file size associated with the file; and
file status associated with the file, where file status includes at least one of:
the file being created,
the file being deleted,
file content associated with the file being modified, and
metadata associated with the file being modified.

4. The computerized method of claim 1, wherein each index includes a status associated with the difference data, the status including at least one of:
a no change operation,
an add operation,
an update operation, and
a delete operation.

5. The computerized method of claim 4, wherein combining indices comprises combining the status for each index across the backup times.

6. The computerized method of claim 4, further comprising:
receiving, at the computing device, a request associated with expiring a third backup;
when the third backup comprises one of the second backup or an intermediary backup, merging difference data associated with an index of a fourth backup that is most recent in time after the third backup into difference data of an index associated with the third backup; and
when the third backup comprises the first backup, and the request to expire the third backup is received at a request time after the first point in time and before a backup point in time associated with the fourth backup, the fourth backup being taken after the first point in time:
disabling, at the computing device, search capability of an index associated with the first backup,
receiving, at the computing device, a request associated with a backup for the fourth backup at the fourth backup point in time, and
merging, at the computing device, difference data associated with an index of the fourth backup into difference data associated with an index associated with the third backup.

7. The computerized method of claim 6, wherein the merged difference data comprises:
a first update operation, when the difference data associated with the third backup index includes one of the add operation or a second update operation and the difference data associated with the fourth backup index includes the first update operation;
a delete operation, when the difference data associated with the third backup index includes the update operation and the difference data associated with the fourth backup index includes the delete operation; and
a no change operation, when the difference data associated with the third backup index includes the add operation and the difference data associated with the fourth backup index includes the delete operation.

8. A computing system for providing search capabilities for data backups by indexing multiple time-based versions of the data backups such that the multiple time-based versions of each of the data backups are factored into a search result, the computing system comprising:
a processor;
a memory coupled to the processor and including instructions that, when executed by the processor, cause the processor to:
receive first data associated with a first backup of a data set, the first data including a list of changes associated with the data set between a first point in time associated with the first backup and a second point in time associated with a second backup, the second point in time being prior to the first point in time, the data set being located on a customer application server and being protected by a data management system;
create for each of the first backup, second backup and one or more intermediary backups an index representative of difference data, the difference data representative at least of changes to content of files in the data set between each of the first backup, the second backup and the one or more intermediary backups, and a corresponding prior backup most recent in time to each of the first backup, second backup and the one or more intermediary backups, each intermediary backup occurring at an associated intermediary point in time occurring between the first backup and the second backup;
receive second data associated with a search request, the search request including an attribute of the data set, the attribute of the data set including a file within the data set and at least one backup time associated with the file; and
retrieve a version of the file associated with the at least one backup time associated with the file, wherein retrieving the version of the file comprises generating the version of the file by combining the difference data from each of the indices associated with the at least one backup time and intermediary backup times between the at least one backup time and the second point in time,
thereby providing search capabilities for data backups by indexing data backups at a plurality of backup times such that multiple versions of each of the data backups are factored into a search result.

9. The computerized method of claim 8, wherein the attribute of the data set further comprises at least one of:
a file name associated with the file,
a directory name associated with a directory,
a backup name associated with a backup,
date ranges associated with the file and the backup, and
file metadata associated with the file.

10. The computing system of claim 8, wherein the list of changes include changes to at least one of:
file path associated with the file;
file type associated with the file;
creation date associated with the file;

modification date associated with the file;
file size associated with the file; and
file status associated with the file, where file status includes at least one of:
the file being created,
the file being deleted,
file content associated with the file being modified, and
metadata associated with the file being modified.

11. The computing system of claim 8, wherein each index includes a status associated with the difference data, the status including at least one of:
a no change operation,
an add operation,
an update operation, and
a delete operation.

12. The computing system of claim 11, wherein combining indices comprises combining the status for each index across the backup times.

13. The computing system of claim 11, wherein the processor is further configured to:
receive a request associated with expiring a third backup;
when the third backup comprises one of the second backup or an intermediary backup, merge difference data associated with an index of a fourth backup that is most recent in time after the third backup into difference data of an index associated with the third backup; and
when the third backup comprises the first backup, and the request to expire the third backup is received at a request time after the first point in time and before a backup point in time associated with the fourth backup, the fourth backup being taken after the first point in time:
disable search capability of an index associated with the first backup,
receive a request associated with a backup for the fourth backup at the fourth backup point in time, and
merge difference data associated with an index of the fourth backup into difference data associated with an index associated with the third backup.

14. The computing system of claim 13, wherein the merged difference data comprises:
a first update operation, when the difference data associated with the third backup index includes one of the add operation or a second update operation and the difference data associated with the fourth backup index includes the first update operation;
a delete operation, when the difference data associated with the third backup index includes the update operation and the difference data associated with the fourth backup index includes the delete operation; and
a no change operation, when the difference data associated with the third backup index includes the add operation and the difference data associated with the fourth backup index includes the delete operation.

15. A non-transitory computer readable medium having executable instructions operable to cause an apparatus to:
receive first data associated with a first backup of a data set, the first data including a list of changes associated with the data set between a first point in time associated with the first backup and a second point in time associated with a second backup, the second point in time being prior to the first point in time, the data set being located on a customer application server and being protected by a data management system;
create for each of the first backup, second backup and one or more intermediary backups an index representative of difference data, the difference data representative at least of changes to content of files in the data set between each of the first backup, the second backup and the one or more intermediary backups, and a corresponding prior backup most recent in time to each of the first backup, second backup and the one or more intermediary backups, each intermediary backup occurring at an associated intermediary point in time occurring between the first backup and the second backup;
receive second data associated with a search request, the search request including an attribute of the data set, the attribute of the data set including a file within the data set and at least one backup time associated with the file; and
retrieve a version of the file associated with the at least one backup time associated with the file, wherein retrieving the version of the file comprises generating the version of the file by combining the difference data from each of the indices associated with the at least one backup time and intermediary backup times between the at least one backup time and the second point in time,
thereby providing search capabilities for data backups by indexing data backups at a plurality of backup times such that multiple versions of each of the data backups are factored into a search result.

16. The non-transitory computer readable medium of claim 15, wherein the attribute of the data set further comprises at least one of:
a file name associated with the file,
a directory name associated with a directory,
a backup name associated with a backup,
date ranges associated with the file and the backup, and
file metadata associated with the file.

17. The non-transitory computer readable medium of claim 15, wherein each index includes a status associated with the difference data, the status including at least one of:
a no change operation,
an add operation,
an update operation, and
a delete operation.

18. The non-transitory computer readable medium of claim 17, wherein combining indices comprises combining the status for each index across the backup times.

19. The non-transitory computer readable medium of claim 17, wherein the apparatus is further caused to:
receive a request associated with expiring a third backup;
when the third backup comprises one of the second backup or an intermediary backup, merge difference data associated with an index of a fourth backup that is most recent in time after the third backup into difference data of an index associated with the third backup; and
when the third backup comprises the first backup, and the request to expire the third backup is received at a request time after the first point in time and before a backup point in time associated with the fourth backup, the fourth backup being taken after the first point in time:
disable search capability of an index associated with the first backup,
receive a request associated with a backup for the fourth backup at the fourth backup point in time, and
merge difference data associated with an index of the fourth backup into difference data associated with an index associated with the third backup.

20. The non-transitory computer readable medium of claim 19, wherein the merged difference data comprises:
- a first update operation, when the difference data associated with the third backup index includes one of the add operation or a second update operation and the difference data associated with the fourth backup index includes the first update operation;
- a delete operation, when the difference data associated with the third backup index includes the update operation and the difference data associated with the fourth backup index includes the delete operation; and
- a no change operation, when the difference data associated with the third backup index includes the add operation and the difference data associated with the fourth backup index includes the delete operation.

* * * * *